UNITED STATES PATENT OFFICE.

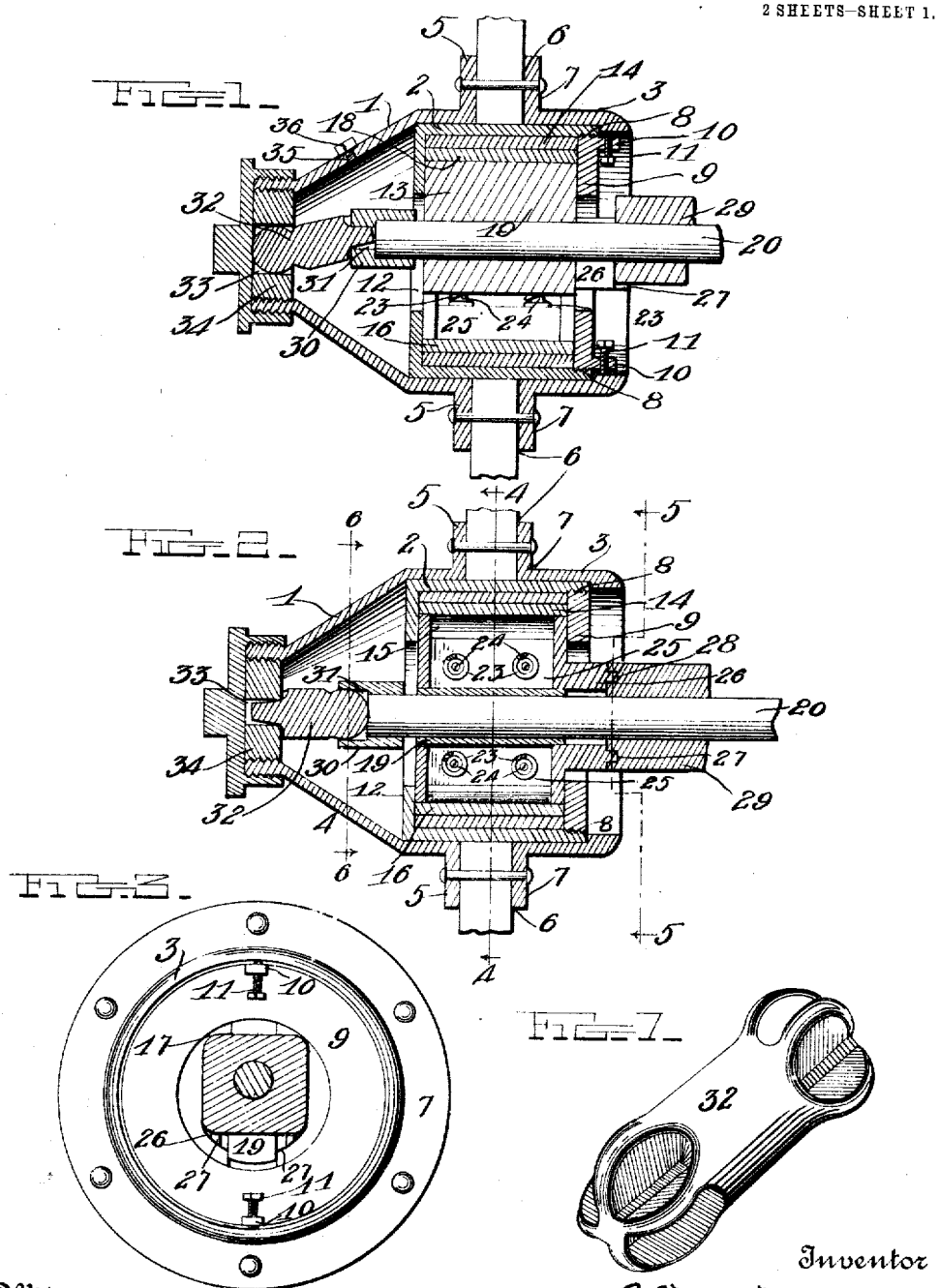

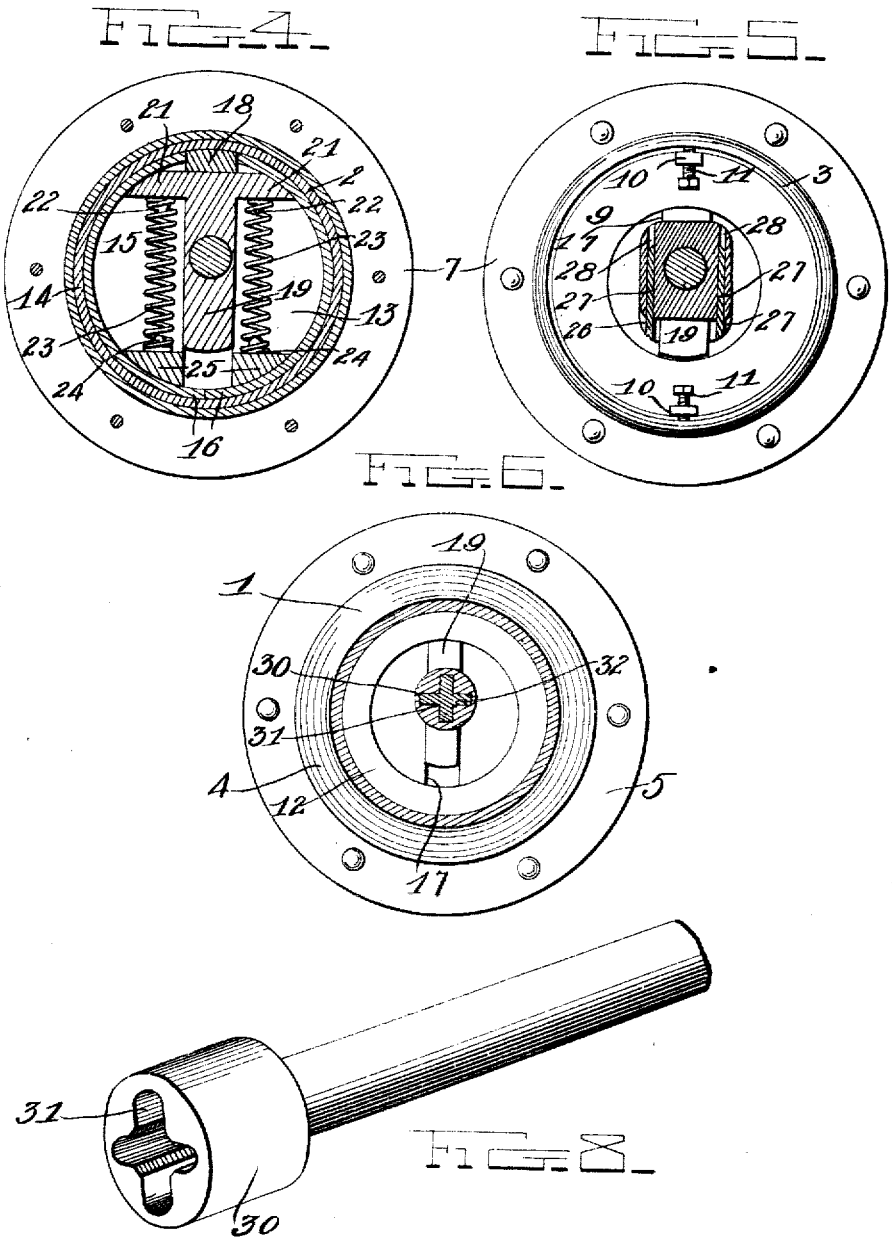

CHRISTIAN CHRISTIANSEN, OF KENMARE, NORTH DAKOTA.

HUB FOR VEHICLE-WHEELS.

1,013,743.                    Specification of Letters Patent.        Patented Jan. 2, 1912.

Application filed January 16, 1911. Serial No. 602,958.

*To all whom it may concern:*

Be it known that I, CHRISTIAN CHRISTIANSEN, a citizen of the United States, residing at Kenmare, in the county of Ward and State of North Dakota, have invented certain new and useful Improvements in Hubs for Vehicle-Wheels; and I do declare the following to be a full, clear, and exact description of the invention, such as will enable others skilled in the art to which it appertains to make and use the same.

This invention relates to improvements in hubs for automobile or other vehicle wheels.

One object of the invention is to provide a hub having springs suitably arranged therein whereby a resilient support is provided for the vehicle which is designed to take the place of a pneumatic tire.

Another object is to provide a hub of this character which will be simple, strong and durable in construction, efficient in operation and well adapted to the purpose for which it is designed.

With these and other objects in view, the invention consists of certain novel features of construction, combination and arrangement of parts as will be more fully described and particularly pointed out in the appended claims.

In the accompanying drawings: Figure 1 is a central vertical longitudinal section of my improved hub; Fig. 2 is a central horizontal sectional view thereof; Fig. 3 is an inner end view of the same; Fig. 4 is a vertical cross sectional view on the line 4—4 of Fig. 2; Fig. 5 is a similar view on the line 5—5 of Fig. 2; Fig. 6 is a similar view on the line 6—6 of Fig. 2; Fig. 7 is a detail view of the bar or link forming part of the universal joint connection between the shaft and hub; Fig. 8 is a perspective view of the outer end of the axle and the joint socket thereon.

Referring more particularly to the drawings, 1 denotes the front end, 2 denotes the central portion and 3 denotes the inner end of the outer casing of the hub. The front end of the casing is tapered toward its outer end as shown at 4 and has its inner end engaged with and rigidly secured to the front end of the central portion of the casing, said end of the central portion projecting into the front portion as shown. On the inner end of the front portion 1 is formed an annular radially projecting flange 5 which forms one side of the spoke receiving channel 6 in which the spokes of the wheel are secured.

The inner portion 3 of the casing is fixedly engaged with the inner end of the central portion 2 and on the inner end of said portion 3 is formed an annular radially projecting flange 7 which co-acts with the flange 5 and forms the other side of the spoke channel 6. The outer end of the central portion 2 of the casing is interiorly threaded as at 8 and into said threaded end is screwed an adjusting ring 9 having on its outer side diametrically disposed lugs 10 provided with threaded apertures in which are arranged set screws 11 adapted to be screwed into engagement with the adjacent inner sides of the casing 3 whereby the ring is locked in its adjusted positions.

The central portion 2 of the casing has formed on its inner end an annular inwardly projecting stop flange 12 between which and the adjusting ring 9 is arranged the inner spring holding an axle receiving member 13 of the hub. The member 13 comprises a cylindrical sleeve or thimble 14 in which is arranged a hollow head 15 formed in two substantially semi-cylindrical sections 16 which are spaced apart to form a vertical guide passage 17 and which closely engage the opposite sides of the thimble as shown. The sections of the head are held apart at their upper sides to form the passage 17 by a spacing block 18 as shown.

Slidably mounted in the passage 17 between the sections of the head is a journal block or box 19 with which is revolubly engaged the axle 20 of the vehicle. On the upper end of the block 19 are formed lugs 21 which project laterally between the opposite ends of the head sections and slidably engage the same. On the inner side of the lugs 21 are formed studs 22 with which are engaged the upper ends of coiled axle supporting springs 23 the lower ends of which are engaged with studs 24 arranged on supporting blocks 25 in the lower portions of the head sections as shown. Any number of springs 23 may be employed two of the same being shown in the present instance on each side of the block 19. By thus arranging the springs and journal block 19 the end of the axle and weight of the vehicle will be yieldingly supported in the hub.

On the rear side of the sections of the head are formed parallel, laterally projecting holding lugs 26 the outer ends of which are reduced to form vertical guide flanges 27 which are adapted to slidably engage vertical guide passages 28 formed in the end of the axle bolster 29 or other stationary portion of the vehicle running gear whereby the spring holding and axle engaging member of the hub is held against turning with the hub.

On the outer end of the axle adjacent to the outer side of the head sections is fixedly mounted a socket 30 forming one member of a universal joint connection between the axle and the outer end of the hub casing 1. In the socket is formed a cross shaped recess 31 with which is loosely engaged the cross shaped inner end of a connecting bar or link 32 the outer end of which is similarly shaped and engaged with a cross shaped recess 33 formed in a cap 34 screwed on the outer end of the section 1 of the casing. The connecting bar 32 when thus arranged forms a universal joint connection between the hub and the axle whereby these parts will turn together without interfering with the action of the springs which form the yielding support for the axle and vehicle. When the axle is not intended to turn with the hub the connecting bar or link 32 may be removed.

In the outer tapered end of the hub casing 1 is formed an oil hole 35 through which oil is introduced to the casing to lubricate the axle and joint connection hereinbefore described. The hole 35 is normally closed by a screw plug 36.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention, what I claim is:—

1. A hub for vehicle wheels comprising an outer casing, an axle receiving member arranged in said casing, a journal block slidably mounted in said member to receive the end of the axle, springs engaged with said block, whereby said block and the axle are supported, adjustable means to hold said axle receiving member against lateral movement, means to hold said axle receiving member against rotation, and means to loosely connect the outer end of the axle with the outer casing of the hub, whereby said axle and casing are revolved together.

2. A hub for vehicle wheels comprising an outer casing, an axle receiving member, said member comprising a sleeve, a head arranged therein, said head comprising two hollow substantially semi-circular sections, a journal block slidably mounted between said head sections and adapted to receive the end of the axle, laterally projecting lugs formed on the opposite sides of said block and having a sliding engagement with said sections, spring supporting blocks arranged in the lower portion of said sections, springs arranged between said lugs and the blocks in said sections, adjustable means to hold said axle receiving member against lateral movement, means to hold the same against rotation, and means to loosely connect the outer end of the axle with the outer casing of the hub whereby said axle and casing will revolve together.

3. A hub for vehicle wheels comprising a casing consisting of a central and end portions, said end portions engaging said central portion and having formed on their inner ends annular radially projecting flanges adapted to form an annular spoke receiving channel, an annular inwardly extending flange formed on the outer end of said central portion of the casing, an axle receiving member arranged in said casing and engaging said flange, an adjusting ring having a screw threaded engagement with the outer end of said central portion of the casing whereby said axle receiving member is held against lateral movement, set screws to lock said ring in its adjusted position, and a yieldingly supported journal block slidably mounted in said axle receiving member.

In testimony whereof I have hereunto set my hand in presence of two subscribing witnesses.

CHRISTIAN CHRISTIANSEN.

Witnesses:
L. F. CLAUSEN,
V. E. GRUNNETT.